(No Model.)
V. ANGERER.
RAILROAD SWITCH.
No. 593,074. Patented Nov. 2, 1897.
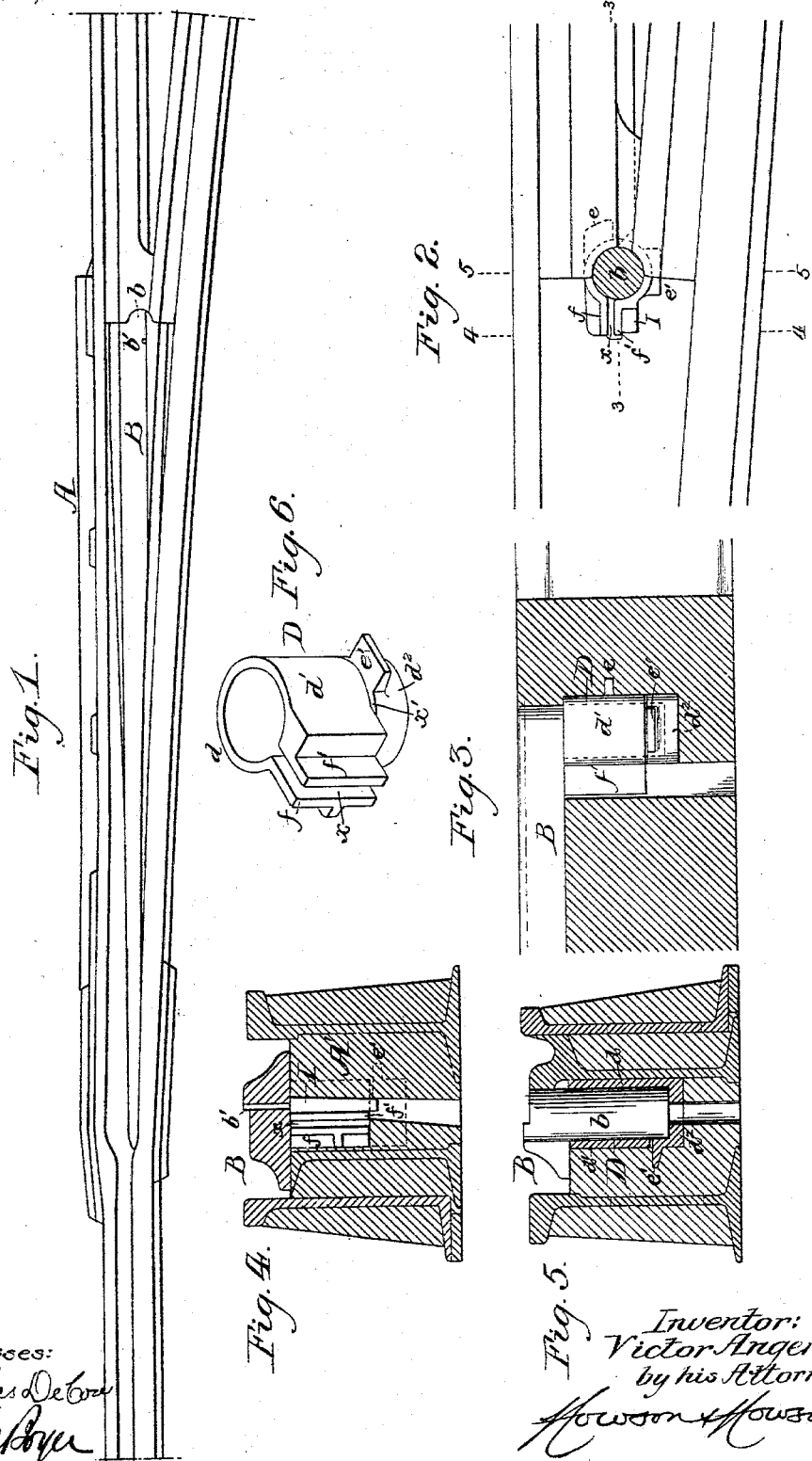
Witnesses:
Charles DeCou
Murray C. Boyer
Inventor:
Victor Angerer
by his Attorneys,
Howson & Howson

UNITED STATES PATENT OFFICE.

VICTOR ANGERER, OF PHILADELPHIA, PENNSYLVANIA, ASSIGNOR TO THE WILLIAM WHARTON, JR., & COMPANY, INCORPORATED, OF SAME PLACE.

RAILROAD-SWITCH.

SPECIFICATION forming part of Letters Patent No. 593,074, dated November 2, 1897.

Application filed September 4, 1897. Serial No. 650,634. (No model.)

*To all whom it may concern:*

Be it known that I, VICTOR ANGERER, a citizen of the United States, residing in Philadelphia, Pennsylvania, have invented certain Improvements in Railroad-Switches, of which the following is a specification.

The object of my invention is to so construct a switch that the wear of the pivot-pin of the tongue in its socket can be taken up. Heretofore simple sockets have been provided for the pivot-pins of switch-tongues, the pin being dropped into or passed through the socket and held therein by means of a key or nut; but in every case the socket was incompressible, so that when the pivot-pin and socket became worn the fit of the pin in the socket was loose, thereby allowing the tongue to work sidewise.

By my invention I am enabled to take up the wear between the pivot-pin and the socket, so that said pin will always have a neat fit in its socket.

In the accompanying drawings, Figure 1 is a plan view of a railroad-switch having a pivot-tongue, illustrating my invention. Fig. 2 is a plan view showing the pivot of the switch-tongue in section. Fig. 3 is a view, partly in elevation and partly in section, on the line 3 3, Fig. 2. Fig. 4 is a transverse section on the line 4 4, Fig. 2, but with the switch-tongue in place. Fig. 5 is a view, partly in elevation and partly in transverse section, on the line 5 5, Fig. 2; and Fig. 6 is a detached perspective view of the socket. Fig. 1 is on a smaller scale than the remaining figures.

A is a switch structure which may be made in any ordinary manner, that shown in the present instance being made of rail-sections secured together by cast metal.

B is a pivot-tongue having a pin $b$, which extends down into the socket D, which is secured in position at the pivot-point by casting the retaining metal around it, the metal being so cast, however, as to allow one wing of the socket free movement when acted upon by a wedge or equivalent means.

The socket is of a form clearly shown in Fig. 6 and is preferably made with the side $d$ and bottom $d^2$ in one piece, but with the side $d'$ capable of a limited movement. In order to form this movable member, I split the socket vertically, forming a vertical slot $x$, and I also split it horizontally on the line $x'$ about one-half way around, so as to leave the section $d'$ free to be contracted onto the pivot-pin. On the section $d$ is a horizontal flange $e$, and on the base-section $d^2$ is a horizontal flange $e'$, the retaining metal being cast around these flanges, so as to permanently hold the socket in position. Vertical flanges $f f'$ project laterally from the ends of the portions $d$ $d'$, and a wedge I is inserted between the retaining-casting A' and the flange $f'$, so that by forcing down this wedge the section $d'$ of the socket is forced toward the fixed section $d$, and consequently the socket is contracted upon the pivot $b$ of the switch-tongue. Other means of making this adjustment may be used instead of the wedge. For instance, a transverse adjusting-screw may bear upon the free end of the portion $d'$, which when screwed up will contract the bearing.

I prefer to place in the cavity $x$, between the two flanges $f f'$, suitable yielding filling material—such as asbestos or rubber—to prevent dirt or other foreign matter entering the space, and I preferably make a hole $b'$ through the switch-tongue B, directly over the wedge, so that by simply inserting a tool in this hole and using a hammer the wedge can be driven down and the bearing tightened upon the pivot-pin.

I claim as my invention—

1. The combination of a switch-tongue, a pivot-pin projecting therefrom, a switch structure, and a socket therein having one section movable, with means for adjusting the socket to take up the wear of the pin, substantially as described.

2. The combination of a switch-tongue, a pivot therefor, a switch structure, and a split socket therein, one portion of the socket being securely held in the structure, with means for adjusting the other portion of the split socket to take up the wear of the pin, substantially as described.

3. A socket for a pivot-pin consisting of a single casting split vertically part way down and split horizontally part way across, forming a movable section and a fixed side and base section, substantially as described.

4. The combination of a switch-tongue having a pivot-pin, a switch structure formed of rails secured together by cast metal, a socket having transverse wings and secured in position by the cast metal, vertical flanges projecting from the two side members of the socket, and a wedge mounted between one of the flanges and the cast-metal structure, substantially as described.

5. The combination of a switch structure having a split bearing, a switch-tongue having a pivot adapted to the bearing, and a wedge for adjusting the bearing, said switch-tongue having a hole directly over the wedge so that a tool can be inserted in the hole to drive the wedge without removing the tongue, substantially as described.

In testimony whereof I have signed my name to this specification in the presence of two subscribing witnesses.

VICTOR ANGERER.

Witnesses:
EDGAR K. BLELOCH,
C. W. CROASDILL.